No. 742,190. PATENTED OCT. 27, 1903.
H. A. HESS.
DEVICE FOR SHARPENING AND CALKING HORSESHOES.
APPLICATION FILED MAR. 15, 1902.
NO MODEL. 2 SHEETS—SHEET 2.
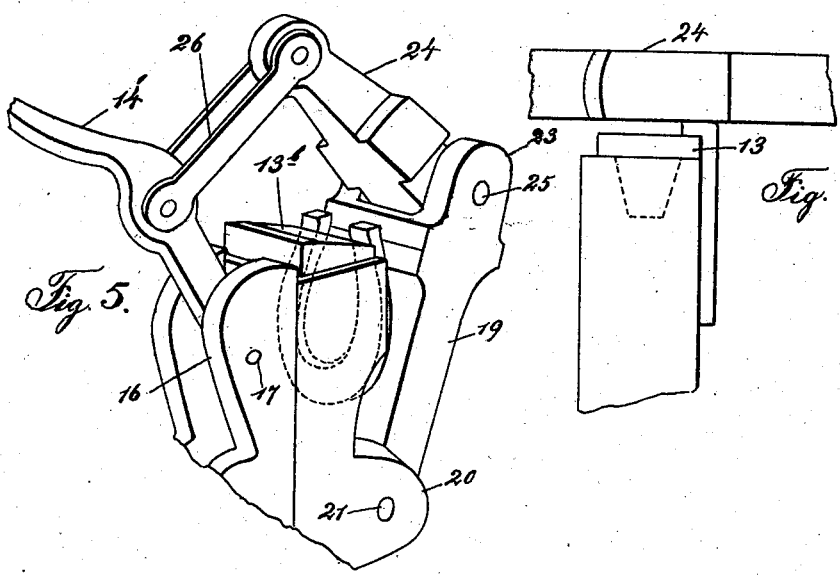
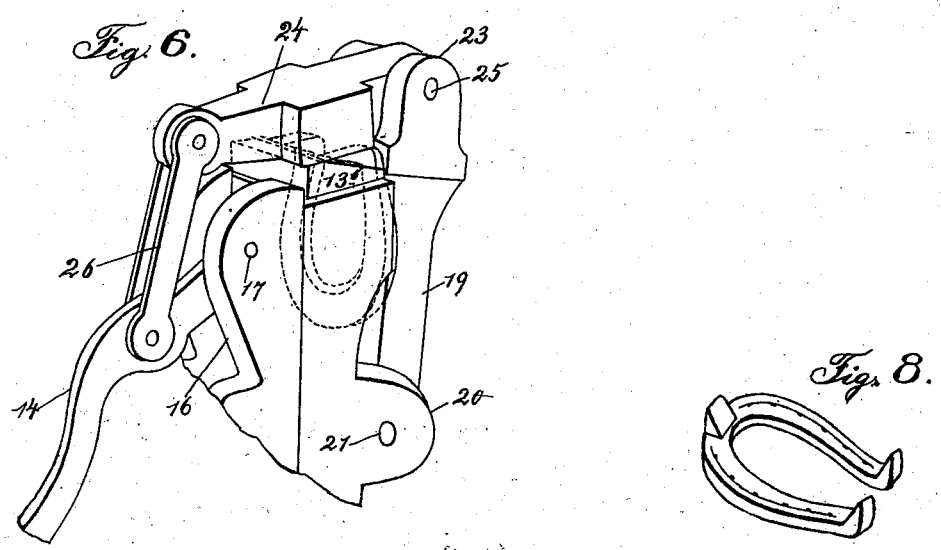
Witnesses:
Henry Manger
Geo. F. White
Inventor: Henry A. Hess.
by Orwig & Lane Attys.

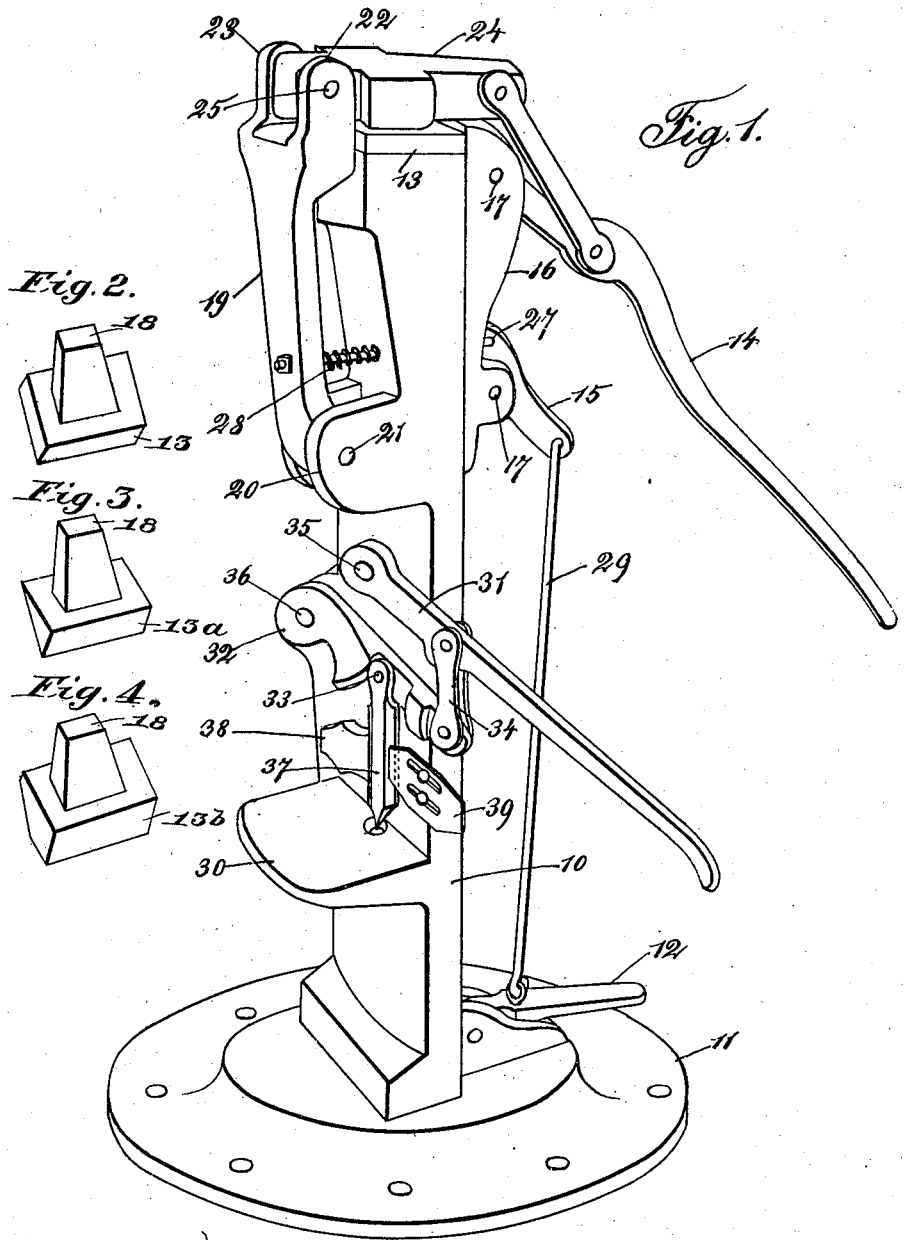

No. 742,190. Patented October 27, 1903.

UNITED STATES PATENT OFFICE.

HENRY A. HESS, OF LINDEN, IOWA.

DEVICE FOR SHARPENING AND CALKING HORSESHOES.

SPECIFICATION forming part of Letters Patent No. 742,190, dated October 27, 1903.

Application filed March 15, 1902. Serial No. 98,340. (No model.)

*To all whom it may concern:*

Be it known that I, HENRY A. HESS, a citizen of the United States, residing at Linden, in the county of Guthrie and State of Iowa, have invented certain new and useful Improvements in Devices for Sharpening and Calking Horseshoes, of which the following is a specification.

The object of my invention is to provide a device for sharpening horseshoes after they have been molded into the desired shape and to so shape these calks that an anvil and hammer will not be necessary.

A further object is to provide a device for sharpening and adjusting the calks and to make them of any desirable size and shape.

A further object is to provide a device of simple, durable, and inexpensive construction which is operated by means of levers to put the shoe into condition for nailing upon the hoof of a horse.

My invention consists in certain details in the construction, arrangement, and combination of the various parts of the device whereby the objects contemplated are attained, as hereinafter more fully set forth, pointed out in my claims, and illustrated in the accompanying drawings, in which—

Figure 1 shows in perspective the complete device in condition for use. Fig. 2 is a perspective view of one of the removable shaping-blocks which is used at the top of the standard. Fig. 3 is a perspective view of one of these removable shaping-blocks designed for the same purpose as the shaping-block described in Fig. 2, except that the upper surface of this shaping-block is beveled. Fig. 4 is another form of the shaping-block shown in Fig. 2, and a portion of the upper surface is beveled. Fig. 5 is a detail view of the top portion of the device, showing one of the shaping-blocks in position at the top of the standard and a horseshoe held in position for shaping one of the rear calks. The levers in this view are raised, and the block which is shown in Fig. 4 of the drawings is used. Fig. 6 is a detail view of the same with the levers at their lower limit of movement, showing the way in which the horseshoe-calk has been shaped and sharpened by means of the lever and shaping-block. Fig. 7 is a detail view of the same, except that the shaping-block shown in Fig. 2 is used and the levers are in their lowered position, showing the shape of the rear calks of a horseshoe designed for summer use; and Fig. 8 shows a horseshoe the calks of which have been shaped by my device.

Referring to the accompanying drawings, I have used the reference-numeral 10 to indicate a standard, the base of which is designed to be mounted upon a floor. Pivotally attached near the base 11 is the lever 12. In the top of the standard I have provided a square-shaped opening designed to hold in place one of the shaping-blocks, which shaping-blocks I have referred to by the numerals 13, 13$^a$, and 13$^b$. Near the upper portion of the standard I have pivotally attached the lever 14. A short distance below this lever 14 and attached at the rear of the standard 10 is the lever 15. The levers 14 and 15 are attached to the standard by means of the braces 16 and the pins 17. The shaping-block 13 has a substantially square block forming its top portion, said top portion having a flat surface which is substantially parallel when in position on the standard with the top portion of said standard. This block 13 also has a squared projection on its under surface, designed to enter the square-shaped opening in the top of the standard. The shaping-block 13$^a$ has a triangular-shaped upper portion, the apex of which triangular portion is at the front edge of it, and also has the projection 18 on its under surface, designed to enter the square-shaped opening in the top of the standard. When this shaping-block 13$^a$ is in position at the top, its front edge is in line with the front upper portion of the standard. The block 13$^a$ at its front portion is very thin and as it approaches its rear portion increases in thickness. The block 13$^b$ is substantially the same shape as the block 13$^a$, except that the incline of this block 13$^b$ extends from the front portion of the block 13$^b$ to the middle portion thereof, thus making the incline from the front portion of the block to the middle portion thereof greater in the block 13$^b$ than from the front to the rear portion in the block 13$^a$. A short distance below the top of the standard, on the front face thereof, I have pivotally attached the lever 19 by means of the extension 20 and the pin 21. This lever has the lugs 22 and 23 at its extreme upper portion, designed to receive between them one end of the upper shaping-block 24, said shaping-block being pivotally attached between said lugs by means of the pin 25. The shaping-block 24 is designed to coact with the shaping-block 13, 13ª, or 13ᵇ which is in its position at the top of the standard.

At the rear end of the shaping-block 24 I have pivotally attached the connecting-link 26 and attached the other end of this link pivotally to the lever 14, so that by a downward movement of the rear end of the lever 14 the shaping-block 24 is brought into contact with the shaping-block which is in position at the top of the upright support. By a movement of the rear end of the lever 14 the shaping-block 24 is moved away from the shaping-block at the upper portion of the support 10.

I have connected the lever 19 with the lever 15 by means of the bolt 27, said bolt 27 being pivotally connected with the lever 15 and extends through the upright support. That portion of the bolt 27 which is between the lever 19 and the front of the upright support has a spring on it to force the lever 19 away from the upright support. To the rear end of the lever 15 I have pivotally attached the rod 29, which is pivotally attached at its other end to the lever 12, so that by pressing upon the upper surface of the lever 12 the lever 19 will be drawn against the front face of the upright support or will engage any object which is placed between the upright support and the lever 19. The spring 28 will always keep the lever 19 away from the front face of the upright support 10, except when pressure is brought to bear upon the lever 12.

Extending from the front face of the upright support 10 and a short distance above the base 11 is the platform 30, having the opening extending vertically through it. A short distance above this platform 30 and below the lever 19 I have pivotally attached the lever 31. Immediately below this lever 31 I have pivotally attached the lever 32, having the central portion thereof partially cut away and having a small pin 33 projecting from the portion of this lever 32 which remains of the lever after said portion has been cut away. These levers 31 and 32 are both pivoted to the front of the support and near the same edge thereof, so that they extend substantially parallel with each other. Pivotally connecting the levers away from their pivotal points of attachment to the front of the upright support 10 is the link 34, which link is a short distance from the pivotal points of the levers 31 and 32 to the standard. The pivot 35 in the lever 31 is nearer the link 34 than the pivot 36 in the lever 32, and there is a handle extending away from the link 34 in the lever 31, so that the lever may be swung on its pivot and lowered, and as the lever 31 is moved the lever 32 is correspondingly moved.

I have provided a utensil 37, having a hole through the upper portion thereof, designed to be placed on the pin 33. I have cut out a V-shaped portion from the lower end of the utensil 37, designed to shape the toe-calk of a shoe which is placed on the platform 30 and beneath the utensil. It will be seen that by raising the lever 31 the utensil 37 will be raised and by lowering this lever the utensil will be lowered. The lever 37 is designed to coact with the platform 30 in shaping and placing the toe-calk. The front faces of the utensil 37 are beveled on each side thereof, and they are prevented from horizontal movement when in position on the pin 33 and when the lever 31 is being raised or lowered by means of the guard 38 and the slidingly-mounted guide 39. The object of having this guide slidingly mounted is to allow the operator to remove the utensil for sharpening or replacing it by another.

In practical use and assuming that the upper series of levers are at their upper limit of movement and that there is no shaping-block at the top of the upright support 10 the operator places the desired shaping-block 13, 13ª, or 13ᵇ in position at the top of the standard, so that if one of the beveled shaping-blocks 13ª or 13ᵇ is used the beveled edge will be at the front of the upright 10. The horseshoe upon which it is desired to make the rear calks is then heated until it becomes red-hot, and the portions out of which the rear calks are to be made are placed against the front edge of the shaping-block 13, 13ª, or 13ᵇ which is used, so that the exact point where the bend in the horseshoe is to be made comes in contact with the front edge of the shaping-block 13, 13ª, or 13ᵇ, as shown in Fig. 8 of the drawings. The operator then places his foot on the lever 12 and presses it downwardly and draws the lever 19 against the horseshoe, so that it is held firmly in place between the lever 19 and the front of the standard 10. The lever 14 is then drawn downwardly, so that the shaping-block 24 bends the rear ends of the horseshoe against the upper beveled surface of the shaping-block 13ª or 13ᵇ which is in position at the top of the upright support 10, as shown in Fig. 9 of the drawings, and by this means the calks are so formed that they are shaped at their exterior ends and the desired results are accomplished in shaping and sharpening the shoe. It will be seen that as the lever 14 is drawn downwardly the shaping-block 24 will be drawn downwardly upon the heated metal which is resting against the lower beveled edge of the shaping-block used at the top of the upright support. Thus it will be seen that the shaping-block 24, which is attached to the lever 14 and the lever 19, will when drawn downwardly turn the calk in a direction away from the lever 19 and onto the beveled portion of the shaping-block used, and the heated metal which forms the calk will be made the same shape as the space between the beveled portion of the shaping-block used at the top of the standard and the portion of the block 24 which is nearest it, and as the shaping-block used at the top of the standard is beveled it will be clearly seen that the end of the calk away from the shoe will be of the same shape as the space between the block 24 and the shaping-block at the top of the standard. The block 24 is then raised away from the beveled edge of the block at the top of the standard. When the shaping-block 13ᵃ is in position at the top of the upright support 10, one or both of the heels may be shaped at the same time; but it is usually preferable to shape one and then shape the other of the heel-calks. The toe-calk is placed on the heated shoe and then pressed into shape and into close contact with the shoe by adjusting this calk beneath the utensil 37 and pressing downwardly on the handle of the lever 31.

Having thus described my invention, what I claim, and desire to secure by Letters Patent of the United States therefor, is—

1. In a device of the class described, the combination of a standard, a shaping-block detachably mounted at the top of said standard, a lever pivotally mounted on the front of said standard and near the top portion thereof, a second shaping-block pivotally mounted at the top of said lever designed to coact with the shaping-block at the top of said standard, a second lever pivotally mounted near the top portion of said standard and on the back portion thereof, a connecting-link pivotally attached to the rear end of the second shaping-block and to the second lever, means connected with the lever which is attached to the front portion of the standard for moving this lever which is at the front portion of the standard on its pivot, for the purposes stated.

2. In a device of the class described, the combination of a standard, a shaping-block having a beveled portion at its forward edge detachably mounted at the top of the standard, a lever pivotally mounted on the front of said standard and near the top portion thereof, a second shaping-block pivotally mounted at the top of said lever designed to coact with the shaping-block at the top of the standard, a second lever pivotally mounted near the top of said standard and on the back portion thereof, a connecting-link pivotally attached to the rear end of the second shaping-block and the second lever, a third lever pivotally mounted on the back portion of said standard and below the second lever, a bolt extending through the upper portion of said standard and attached at one end to the lever on the front portion of said standard and at its other end pivotally attached to the upper portion of the third lever, a coil-spring mounted on said bolt between the rear portion of the lever on the front of said standard and the front portion of the standard, a fourth lever pivotally mounted in the base of said standard and at its back portion, and a rod connecting the rear end of the third lever and the fourth lever, for the purposes stated.

Des Moines, Iowa, February 17, 1902.

HENRY A. HESS.

Witnesses:
IRA D. PAYNE,
IRWIN PARKER.